United States Patent
Matsumoto et al.

(10) Patent No.: US 7,826,080 B2
(45) Date of Patent: Nov. 2, 2010

(54) PRINT SYSTEM, PRINT METHOD, INFORMATION PROCESSING APPARATUS AND METHOD OF CONTROLLING THE INFORMATION PROCESSING APPARATUS

(75) Inventors: Atsushi Matsumoto, Tokyo (JP); Yushi Matsukubo, Yokohama (JP); Yukihiko Shimizu, Urayasu (JP); Masataka Yasuda, Kawasaki (JP); Noriyuki Kobayashi, Kawasaki (JP); Shinichiro Maekawa, Kawasaki (JP); Takeshi Namikata, Yokohama (JP); Hideki Sakai, Sakura (JP); Hirohiko Tashiro, Kawasaki (JP); Masamichi Akashi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1087 days.

(21) Appl. No.: 11/148,286

(22) Filed: Jun. 9, 2005

(65) Prior Publication Data
US 2005/0275862 A1 Dec. 15, 2005

(30) Foreign Application Priority Data
Jun. 9, 2004 (JP) ............................. 2004-171769

(51) Int. Cl.
*G06F 3/12* (2006.01)
(52) U.S. Cl. .................... 358/1.15; 358/1.14; 718/104
(58) Field of Classification Search ............ 712/3; 718/100, 104, 105; 370/428; 711/100; 358/1.15, 358/1.13, 1.14, 1.17
See application file for complete search history.

(56) References Cited

U.S. PATENT DOCUMENTS

| | | | | |
|---|---|---|---|---|
| 5,197,130 A | * | 3/1993 | Chen et al. ............... | 712/3 |
| 5,652,711 A | * | 7/1997 | Vennekens ............... | 358/1.17 |
| 5,692,192 A | * | 11/1997 | Sudo ....................... | 718/105 |
| 7,180,626 B1 | * | 2/2007 | Gassho et al. ............ | 358/1.15 |
| 2002/0060809 A1 | * | 5/2002 | Aoki ....................... | 358/1.15 |
| 2003/0193683 A1 | * | 10/2003 | Motamed et al. ........ | 358/1.13 |
| 2004/0223182 A1 | * | 11/2004 | Minagawa ............... | 358/1.15 |
| 2005/0076173 A1 | * | 4/2005 | Merril et al. ............. | 711/100 |
| 2005/0076336 A1 | * | 4/2005 | Cutrell et al. ............ | 718/100 |
| 2005/0076339 A1 | * | 4/2005 | Merril et al. ............. | 718/104 |

(Continued)

FOREIGN PATENT DOCUMENTS

JP 07-121469 5/1995

(Continued)

OTHER PUBLICATIONS

Office Action, dated Sep. 18, 2007, in JP 2004-171769.

(Continued)

*Primary Examiner*—Twyler L Haskins
*Assistant Examiner*—Nicholas C Pachol
(74) *Attorney, Agent, or Firm*—Fitzpatrick, Cella, Harper & Scinto (57) ABSTRACT

In a network print system in which a printer and at least one client are connected to each other through a network, and at least a part of a job for the printer can be subjected to load distributed processing by grid computing, wherein when a printer driver of the printer is installed on any one of the at least one client, the system is adapted to build a grid computing network. In this arrangement, it is easily to build the grid computing network in which the printer job is subjected to load distributed processing.

7 Claims, 11 Drawing Sheets

U.S. PATENT DOCUMENTS

2005/0083960 A1* 4/2005 Gutierrez et al. ............ 370/428
2005/0094182 A1* 5/2005 Reese et al. ................ 358/1.14
2006/0279777 A1* 12/2006 Matsumoto ................ 358/1.15

FOREIGN PATENT DOCUMENTS

| | | |
|---|---|---|
| JP | 11259258 | 9/1999 |
| JP | 2003196058 | 7/2003 |
| WO | WO/01/37075 * | 5/2001 |

OTHER PUBLICATIONS

Kashima, Hiroshi, "Adaptability of grid computing to commercial systems", IBM PROfessionals' Papers, ProVISION No. 36, Winter 2003.
U.S. Appl. No. 11/148,257, filed Jun. 9, 2005.
U.S. Appl. No. 11/148,264, filed Jun. 9, 2005.
U.S. Appl. No. 11/148,268, filed Jun. 9, 2005.
U.S. Appl. No. 11/148,269, filed Jun. 9, 2005.
U.S. Appl. No. 11/148,298, filed Jun. 9, 2005.
U.S. Appl. No. 11/197,511, filed Aug. 5, 2005.

* cited by examiner

DATABASE 1

| CLIENT No. | IP ADDRESS | CPU (CLOCK FREQUENCY) |
|---|---|---|
| 1−1 | 192.168.10.10 | 3.0GHz |
| 1−2 | 192.168.10.32 | 1.6GHz |
| 1−3 | 192.168.10.65 | 2.7GHz |

FIG. 9B

DATABASE 2

| CLIENT No. | IP ADDRESS | CPU (CLOCK FREQUENCY) |
|---|---|---|
| 2−1 | 192.168.10.15 | 2.0GHz |
| 2−2 | 192.168.10.8 | 2.4GHz |
| 2−3 | 192.168.10.80 | 1.7GHz |

FIG. 10

DATABASE 1

| CLIENT No. | IP ADDRESS | CPU (CLOCK FREQUENCY) |
|---|---|---|
| 1-1 | 192.168.10.10 | 3.0GHz |
| 1-2 | 192.168.10.32 | 1.6GHz |
| 1-3 | 192.168.10.65 | 2.7GHz |
| 1-4 | 192.168.10.15 | 2.0GHz |
| 1-5 | 192.168.10.8 | 2.4GHz |
| 1-6 | 192.168.10.80 | 1.7GHz |

FIG. 11

PRINT SYSTEM, PRINT METHOD, INFORMATION PROCESSING APPARATUS AND METHOD OF CONTROLLING THE INFORMATION PROCESSING APPARATUS

FIELD OF THE INVENTION

The present invention relates to a network print system and a grid network building method in the network print system and, more particularly, to a network print system in which a printer and a plurality of clients are connected to each other through a network, and at least a part of a job for the printer can be subjected to load distributed processing by grid computing.

BACKGROUND OF THE INVENTION

In recent years, grid computing (to be also simply referred to as "grid" hereinafter) has received a great deal of attention, which makes a plurality of computers connected through a network available as if they were a single system. Attempts to apply it to various fields have been made.

Figure 1:
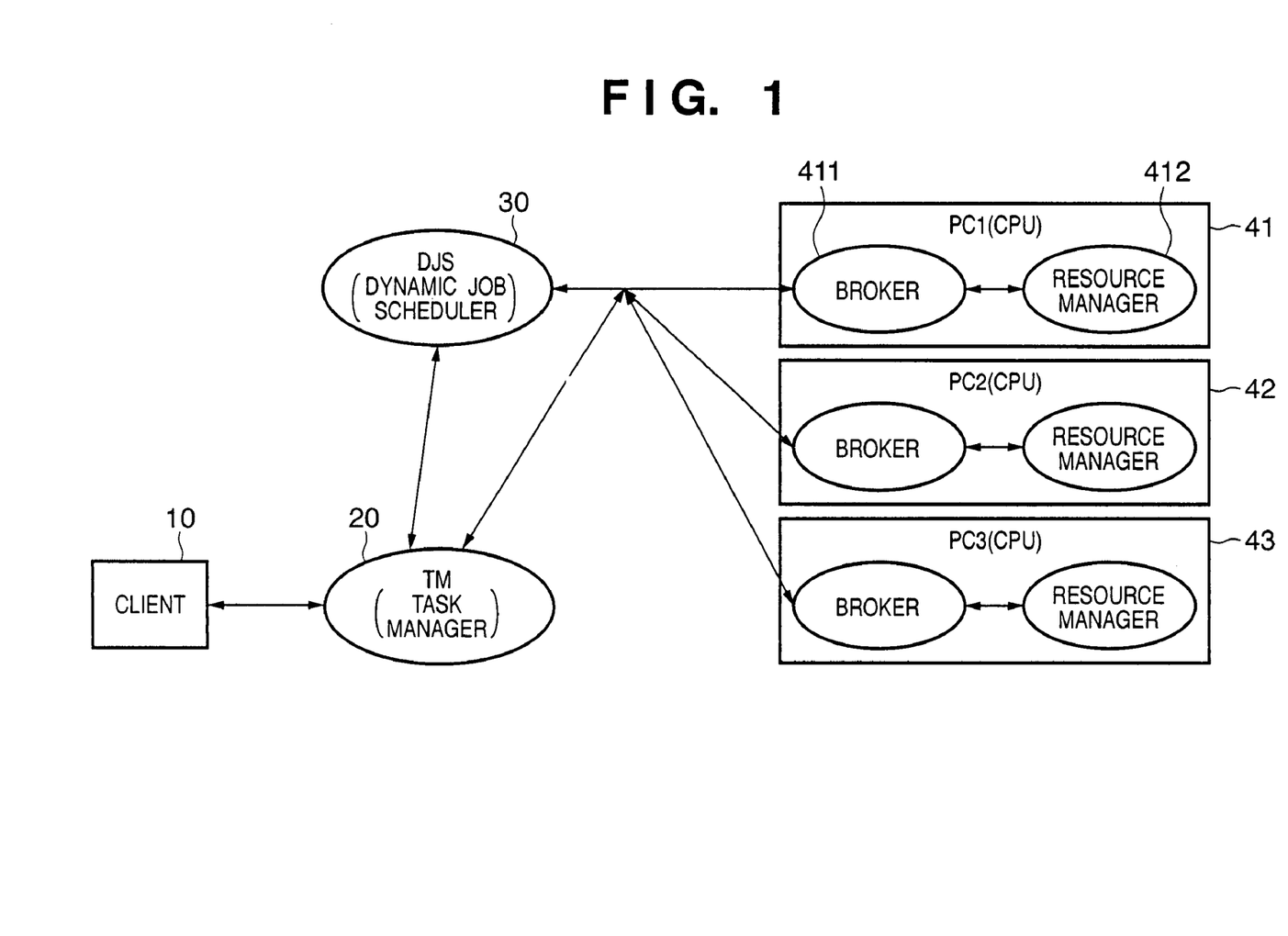
FIG. 1 is a block diagram showing the basic arrangement of grid computing.

FIG. 1 is a block diagram for explaining the architecture of grid computing. There exist several kinds of grids. One called a desktop grid will be explained here, which executes a job by using the vacant time of the CPU of, e.g., a desktop PC.

Referring to FIG. 1, a client 10 is a device to which a user inputs a job as a request. The input job is transferred to a task manager (to be abbreviated as TM hereinafter) 20. The TM 20 transmits the contents of the job to a dynamic job scheduler (to be abbreviated as DJS hereinafter) 30.

The DJS 30 manages the resources of all of a plurality of host devices 41 to 43 each of which includes a broker 411 and resource manager (to be abbreviated as RM hereinafter) 412 and is recognized as a resource. The DJS 30 analyzes the job, selects the broker 411 of an optimum resource, and notifies the TM 20 of it. "Resource" means the vacant state of an available CPU.

The broker 411 registers, in the DJS 30, resource information acquired by the RM 412 and inputs the job to an optimum resource in accordance with the request from the TM 20. When the job is finished, the broker 411 notifies the TM 20 of the completion of the job.

The TM 20 inputs the job to the optimum broker 411 selected by the DJS 30 and monitors the state of progress of the job. Upon receiving the completion notification from the broker 411, the TM 20 notifies the client 10 of the result. When a change or error (e.g., a failure or reception of another job) has occurred in the resource, the RM 412 notifies the broker 411 of it.

With this mechanism, a job is distributed to a resource such as a CPU which is normally unused so that distributed processing can be executed by a plurality of devices without making the user conscious. Hence, desktop grid computing is implemented.

Scientific research has extensively been done for implementing high-speed processing by collecting the CPU powers of computers using the above-described grid computing technologies. However, application of grid computing to an incorporated device such as MFP (Multi Function Peripheral) called a multifunction apparatus or SFP (Single Function Peripheral) has not been implemented yet.

For example, when this technology is applied to an image forming system including MFP connected to an office LAN, PCs, server, and MFP on the LAN are used as resources to be subjected to distributed processing.

However, in order to implement grid computing, each PC to be subjected to distributed processing needs to be registered, and the setup of the PC needs to be done. Because of these overloaded and cumbersome processes, it is difficult for a user to build this system. Since it is also cumbersome to release the registration of the PC and register a new PC again, it is not easy to change and add the grid network.

SUMMARY OF THE INVENTION

It is an object of the present invention to easily build a grid computing network by installing a program for registering a client PC at the same time when the printer driver of a network printer is installed.

In order to achieve the above object, according to an aspect of the present invention, there is provided a network print system in which a printer and at least one client are connected to each other through a network, and at least a part of a job for the printer can be subjected to load distributed processing by grid computing, wherein when a printer driver of the printer is installed on any one of the at least one client, the system is adapted to build a grid computing network.

That is, according to the present invention, there is provided a network print system in which a printer and at least one client are connected to each other through a network, and at least a part of a job for the printer can be subjected to load distributed processing by grid computing. In this system, when a printer driver of the printer is installed on any one of the at least one client, the system is adapted to build a grid computing network.

In this arrangement, when installing the printer driver on the client, the client is subjected to load distributed processing.

Therefore, the user of the client only needs to install the printer driver. Hence, it is easily to build the grid computing network in which the printer job is subjected to load distributed processing.

The printer may include a database in which information of the client subjected to load distributed processing is stored, and when the printer driver of the printer is installed on any one of the client, the client may notify the printer that the client is to be subjected to load distributed processing, and transmits required information to the printer, in response to reception of the notification and the required information, the printer may register the client in the database, and transmit a program for allowing load distributed processing to the client, and when the program is executed in the client which receives the program, the grid computing network is built.

The required information may be one of an IP address and an operation speed of a CPU.

Preferably, when the printer driver of the printer is installed on any one of the client, an interface window is displayed, which causes a user to select whether the client is permitted to be subjected to load distributed processing, and when the user permits the client to be subjected to load distributed processing, the grid computing network is built.

The printer may includes a database in which information of the client subjected to load distributed processing is stored, a plurality of groups each having the printer and the at least one client may be included, and the printer and the at least one client may be connected to each other in each of the groups, and the printers may transmit/receive pieces of information in the respective databases to/from each other, and a client in another group may be subjected to load distributed processing.

In this case, the printers may transmit/receive pieces of information in the respective databases to/from each other to update the pieces of information in the databases, such that the client in another group is subjected to load distributed processing.

The job may includes PDL-related processing, and the printer may be a multifunction device having a plurality of functions, and each client may be a personal computer.

The above object can also be achieved by a method corresponding to the above-described network print system, a computer program which causes a computer apparatus to execute the grid network building method, and a storage medium which stores the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. Note that each element in the following embodiments is not intended to limit the scope of the invention, but is described only as an example.

(Outline)

The outline of a network print system according to the present invention, which is common to the following embodiments, will be described first.

According to the present invention, in a network print system in which a printer and a plurality of clients (information processing apparatuses) are connected to each other through a network, a job input from each of the clients is subjected to load distributed processing by grid computing. When the printer has a job scheduler function of a grid network, a device serving as a resource to be subjected to distributed processing is registered in a database on the basis of information transmitted from the client.

The grid computing network is easily built in the following sequence.

In the client, when installing a printer driver serving as software required to use the printer through the network, the client notifies the printer that the printer is permitted to be used as the resource of the grid network, and transmits information required to register the printer in the grid network. When receiving the notification, the printer registers the client as the resource in the database, and transmits, to the client, a setup program for using the client as the resource. Then, since the client executes the setup program, the grid network is built.

Figure 2:
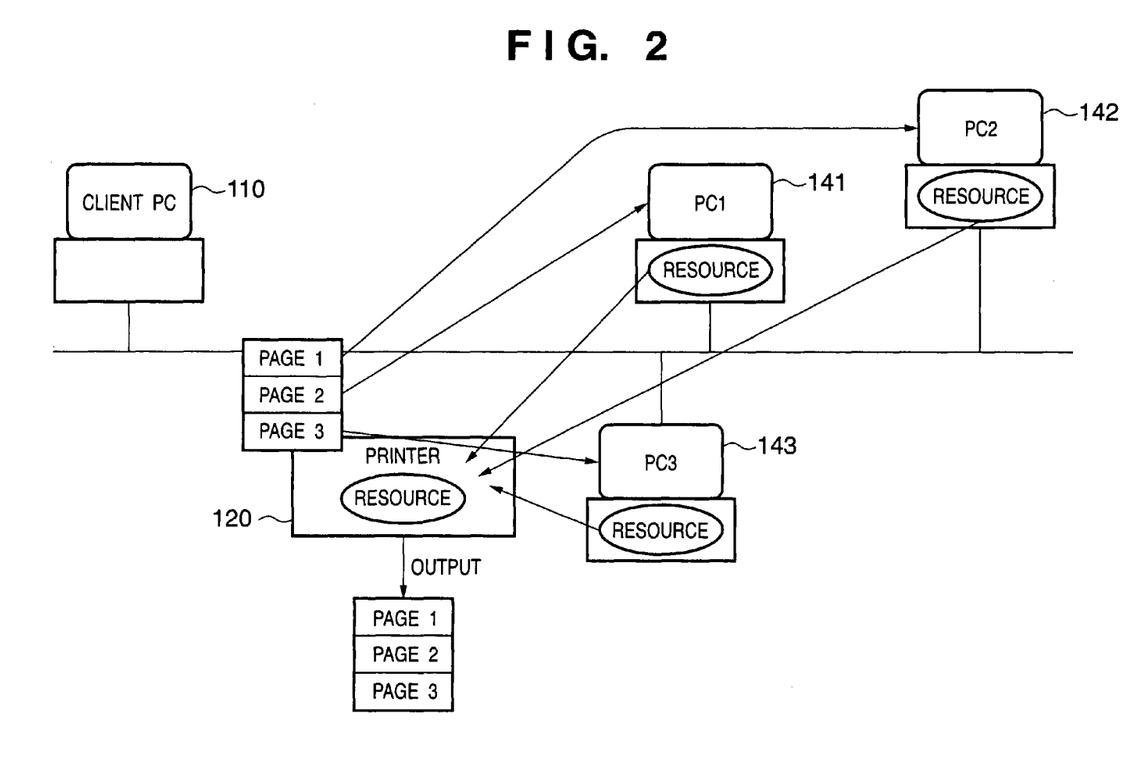
FIG. 2 is a block diagram showing the arrangement of a network print system according to the present invention.

FIG. 2 is a block diagram showing the basic arrangement of the image forming system according to the present invention, in which grid computing is applied to PDL processing (rendering processing of a page description language to a raster image) of a printer. In the arrangement shown in FIG. 1, the modules included in the grid are handled as separate devices. However, when the system is applied to an image forming apparatus such as MFP or printer, generally, a plurality of modules are present in one device.

In the arrangement shown in FIG. 2, the user inputs a job such as a print instruction from a client PC 110. The input job is analyzed by an image forming apparatus 120 such as a printer having TM and DJS functions. Distributed processing by grid computing is executed by using the resources of three PCs, i.e., PC 1 (141), PC 2 (142), and PC 3 (143) each having a broker and RM.

In the arrangement shown in FIG. 2, the image forming apparatus 120 also has the function of the host in grid computing. A PC except the image forming apparatus 120 may have the function of the host, as a matter of course.

When the print job of PDL is input from the client PC 110, the job is appropriately distributed to the resources of the PCs 141 to 143 through the TM and DJS of the image forming apparatus 120. At this time, the application program for image rendering processing of PDL is also simultaneously transmitted from the image forming apparatus 120 to each PC.

Images which are formed by causing the respective PCs to render PDL are collected by the image forming apparatus 120 and finally output in the collected state.

The number of clients (resources) to be subjected to distributed processing is not particularly limited. Three or more clients may be used. The resource of the client PC 110 to which the job is input or the resource of the image forming apparatus 120 may be subjected to distributed processing.

First Embodiment

In the first embodiment, by using a network printer having a copy function as a printer, the network printer has the job scheduler function of a grid network, and a job input from a client is subjected to distributed processing in each resource.

(Hardware Configuration of Network Printer)

Figure 3:
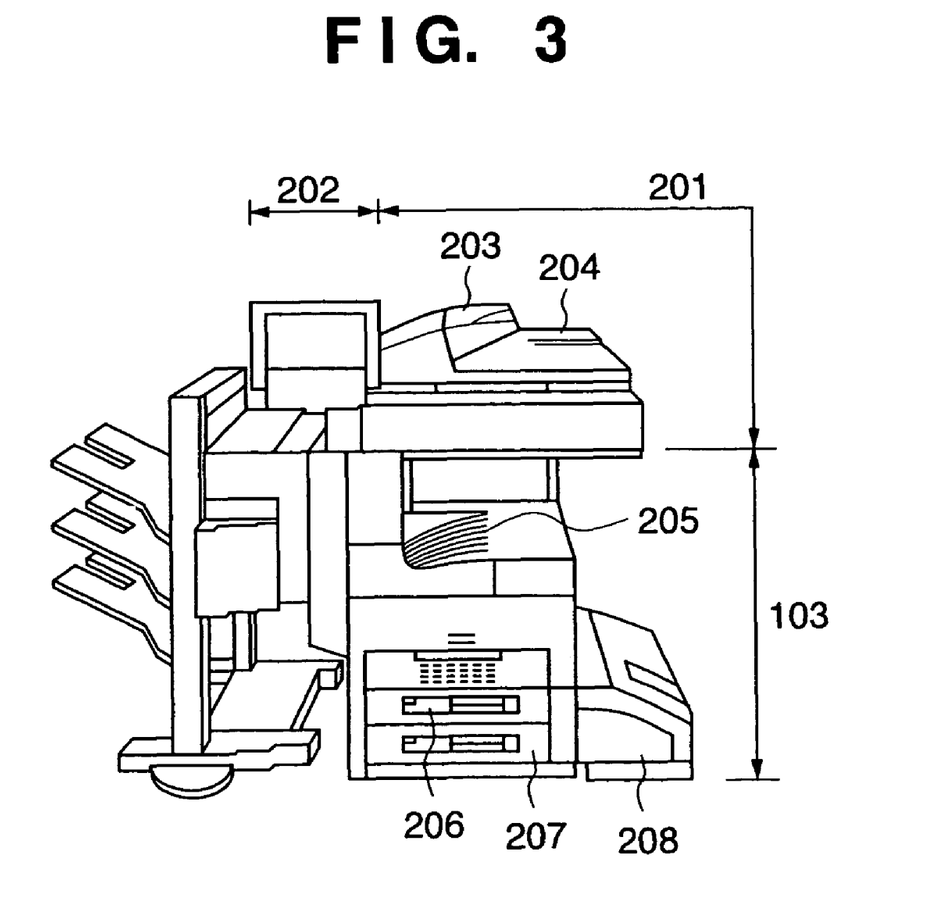
FIG. 3 is a view showing the outer appearance of a network printer according to the present invention.

FIG. 3 is a view showing the outer appearance of an image forming apparatus having a copy function according to the first embodiment. A scanner 201 serving as an image input device illuminates an image on a paper sheet as a document and scans a CCD line sensor (not shown) to generate raster image data.

The user sets document paper sheets on a tray 203 of a document feeder 204 and inputs a reading operation start instruction from an operation unit 202. The controller CPU of the image forming apparatus gives an instruction to the scanner 201. The feeder 204 feeds the document paper sheets one by one. The scanner 201 reads the document images.

The operation unit 202 serves as a user interface to do setting instruction or status display in the copy operation or designate various kinds of operation settings.

A printer engine 103 serving as an image output device prints the raster image data on paper sheets. The printer engine 103 can employ any scheme such as the electrophotography scheme using a photosensitive drum or photosensitive belt or the inkjet scheme to print an image on a paper sheet directly by discharging ink from a micro nozzle array. The print operation is activated by an instruction from the controller CPU.

The printer engine 103 has a plurality of paper feed stages to select different paper sizes or different paper orientations and comprises corresponding paper sheet cassettes 206, 207, and 208. A discharge tray 205 receives printed paper sheets.

Figure 4:
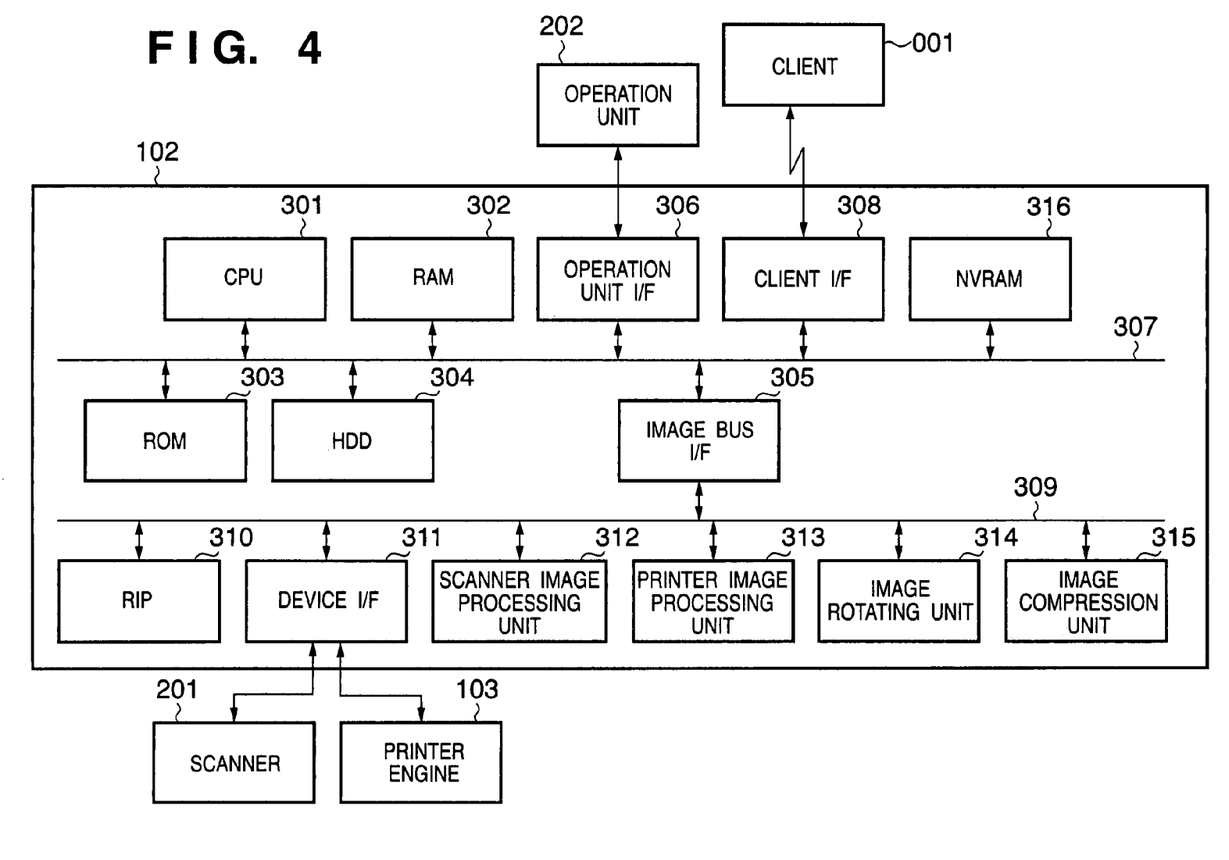
FIG. 4 is a block diagram showing the control arrangement of the network print system shown in FIG. 3.

FIG. 4 is a block diagram showing the control configuration of the image forming apparatus of this embodiment. A printer controller 102 is connected to the scanner 201 serving as an image input device and the printer engine 103 serving as an image output device. The printer controller 102 also transmits/receives print data, image information, and device information to/from each client through a client I/F 308.

A CPU 301 is a controller to control the entire system. A RAM 302 is a system work memory used by the CPU 301 to operate. The RAM 302 also serves as an image memory to temporarily store image data. A ROM 303 is a boot ROM which stores the boot program of the system. An HDD 304 is a hard disk drive to store system software and image data.

An operation unit I/F 306 is an interface to the operation unit (UI) 202 and outputs, to the operation unit 202, image data to be displayed on it. The operation unit I/F 306 also transmits information input by the user through the operation unit 202 to the CPU 301. Environment setting information such as an operation mode input from the operation unit 202 is stored in an NVRAM 316 serving as a nonvolatile memory.

The client I/F 308 transmits/receives information to/from each client. The above-described devices are arranged on a system bus 307.

An image bus I/F 305 serving as a bus bridge connects the system bus 307 to an image bus 309 which transfers image data at a high speed, and the image bus I/F 305 converts the data structure.

The following devices are arranged on the image bus 309. A raster image processor (RIP) 310 renders a PDL code transmitted from the network to a bitmap image. A device I/F unit 311 connects the scanner 201 and printer engine 103 serving as image input and output devices to the printer controller 102 to convert the synchronous and asynchronous systems of image data.

A scanner image processing unit 312 corrects, manipulates, or edits input image data. A printer image processing unit 313 executes printer correction or resolution conversion for print output image data. An image rotating unit 314 rotates image data. An image compression unit 315 executes JPEG compression/expansion processing for multilevel image data and JBIG, MMR, or MH compression/expansion processing for binary image data.

The network printer is connected to each of the clients through a client interface (e.g., intercommunicable network interface such as the Ethernet) 308 to build a network print system which can be subjected to load distributed processing by grid computing.

The above-described network printer also has the job scheduler function of the grid network. The device serving as the resource in which the job is subjected to load distributed processing is selected from the clients on the basis of the database pertaining to the clients registered in advance.

Grid computing network building processing according to this embodiment will be described below with reference to the flowchart shown in FIG. 5.

Figure 5:
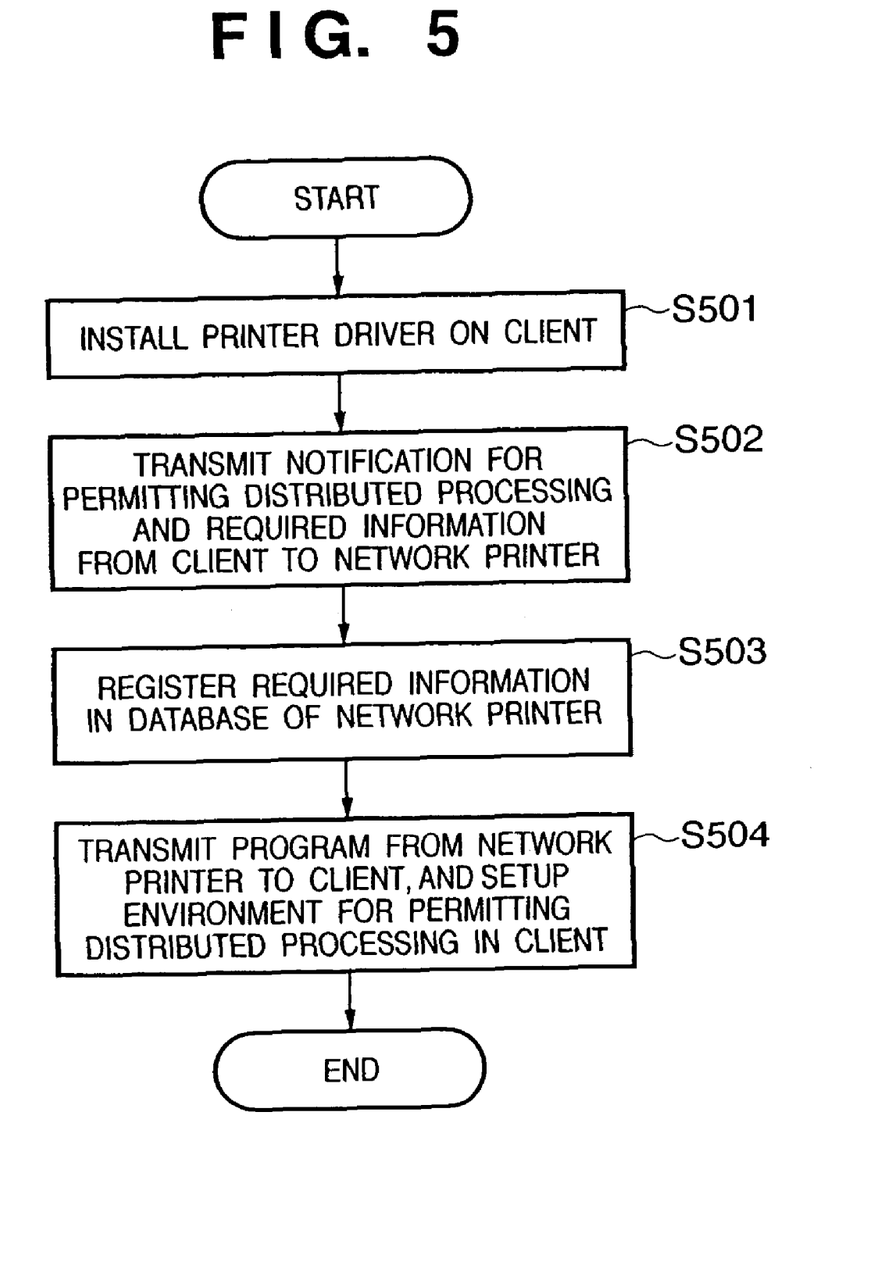
FIG. 5 is a flowchart showing grid network building processing according to the first embodiment.
Figure 11:
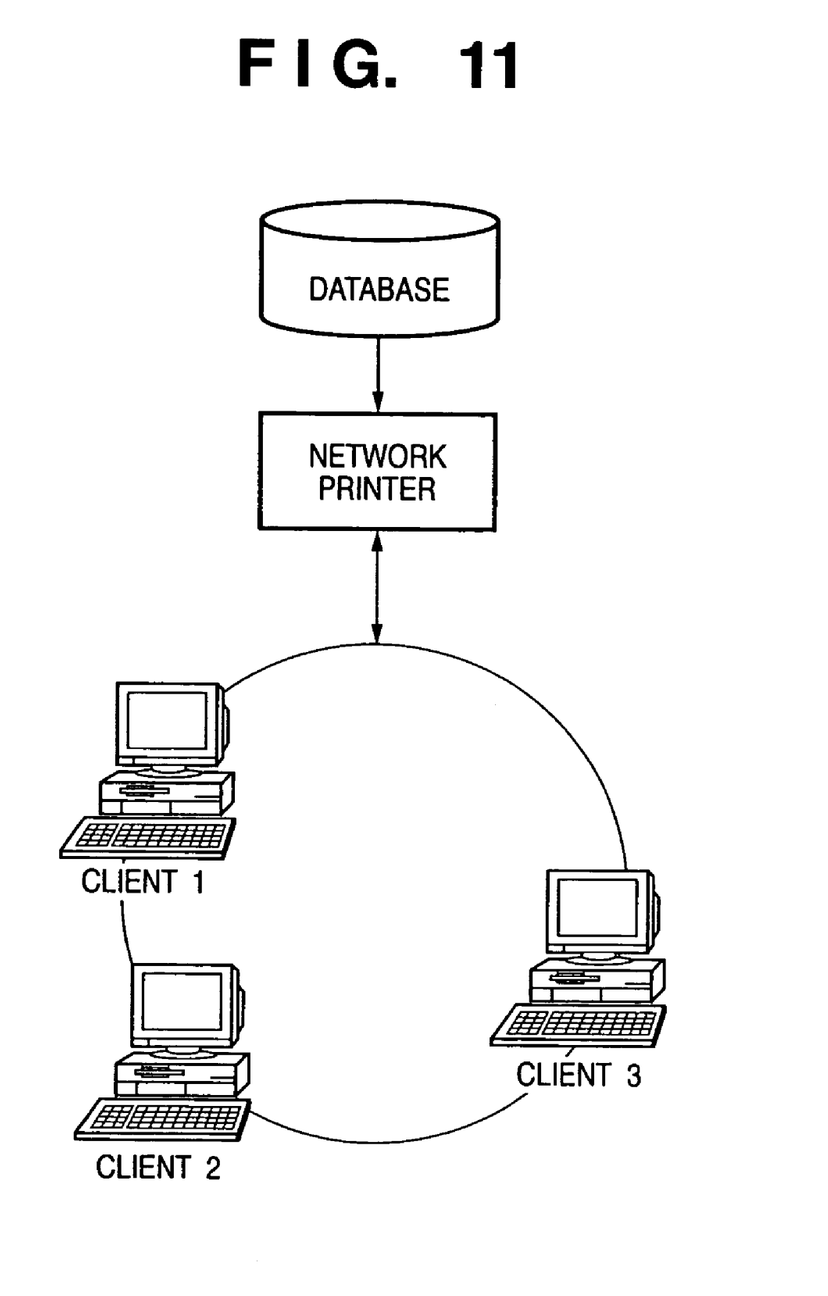
FIG. 11 is a block diagram showing the arrangement of the grid network according to the first and second embodiments.

Note that processing executed in the network printer in the flowchart shown in FIG. 5 is executed under the control of a CPU 301 in accordance with a system program stored in an HDD 304 shown in FIG. 4. FIG. 11 is a block diagram showing the database, the network printer, and the clients building the grid computing network. The database may be stored in the HDD 304, or another storage means. The present invention will be described along with the following flow.

In step S501, a printer driver serving as software for printing the information by using the network printer is installed on the client.

The printer driver generally serves as the software used to convert a document and image created by an application into a page description language (PDL) capable of processing the document and image at a high speed by the printer, and transmit or output the PDL file to the printer.

In step S502, the client notifies the network printer to be subjected to processing of the printer driver that the client can be used as the resource of grid computing, and then transmits required information. For example, an IP address and the operation speed (clock frequency) of the CPU are available as the information to be transmitted. However, the present invention is not limited to these if the information is required to execute load distributed processing by grid computing.

In step S503, the network printer receives the required information transmitted from the client in step S502. The information of the client to be subjected to load distributed processing is registered in the grid database.

In step S504, the network printer transmits a program (e.g., screen saver) for causing the client to execute load distributed processing by grid computing. This program is a program which is executed by the CPU of the client with a free space, and has the functions of an RM and broker of the grid. When executing the received program, the client is subjected to load distributed processing. Note that since the program transmitted from the network printer to the client is set in an auto-executable format, the operation of the user is not further required, preferably.

The above-described processing is executed when the printer driver is installed on the client, such that the client connected to the network printer is registered in the database as the resource to build the grid computing network.

In the grid computing network built as described above, processing executed when the client is subjected to distributed processing will be briefly described below. Note that in this case, a print job executed by the PDL is processed as the job. However, the present invention is not limited to this if the job can be subjected to load distributed processing.

When receiving the print job of the PDL from any one of the clients, the TM of the network printer inquires of the DJS to select an optimum broker. However, when selecting this optimum broker, the client which has the optimum resource is selected on the basis of the client information registered in the database. In a method of selecting the client having the optimum resource, for example, a client having larger CPU power may be selected. However, the present invention is not limited to this if the information registered in the database is used.

The selected client receives the processing program (PDL rendering program when the data is the PDL) and job data, in accordance with the kinds of print jobs. Then, the processes of selecting the client and inputting the job are finished. Since the following processing to the print operation is the same as those of the general grid framework, a description of the following processing will be omitted.

As described above, when the printer driver which uses the network printer is installed on the client, a grid computing environment is setup. On the network printer side, since the information transmitted from the client is registered in the database, the grid computing network is built.

When the job is input from one of the clients, the network computer selects the client to be subjected to load distributed processing on the basis of this database.

As described above, according to this embodiment, special knowledge and cumbersome processing are not required for building the grid computing network and setting up the client. Hence, the grid computing network can be built and the client can be setup, simply and easily.

Second Embodiment

The second embodiment of the present invention will be described below. The print system of the second embodiment is similar to the first embodiment. A description of the same parts as in the first embodiment will be omitted, and characteristic parts of the second embodiment will mainly be described.

In the first embodiment, a client automatically enters a grid network when installing a printer driver on the client. In the second embodiment, each user can select whether he enters the grid network.

Figure 6:
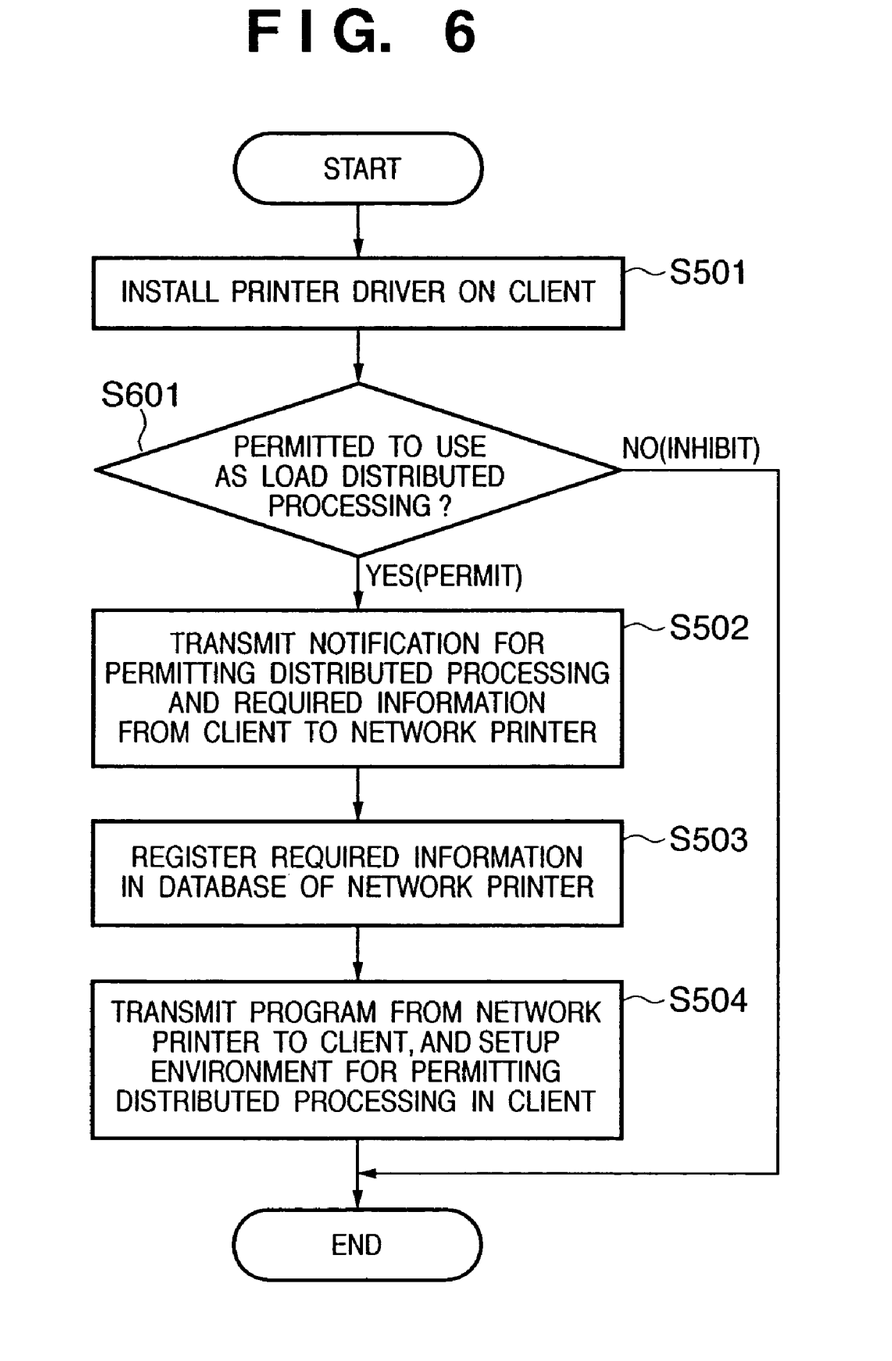
FIG. 6 is a flowchart showing grid network building processing according to the second embodiment.

Grid computing network building processing according to the second embodiment will be described below with reference to the flowchart shown in FIG. 6. In FIG. 6, the same reference numerals as in FIG. 5 according to the first embodiment denote the same parts in FIG. 6.

In step S501, a printer driver serving as a software for printing the information by using the network printer is installed on the client.

In step S601, the software which is activated when installing the printer driver displays a window serving as a user interface, which causes the user to select whether the client can be subjected to load distributed processing. The user operates an input means such as a mouse to select and instruct whether the client is permitted/inhibited to be subjected to load distributed processing.

Figure 7:
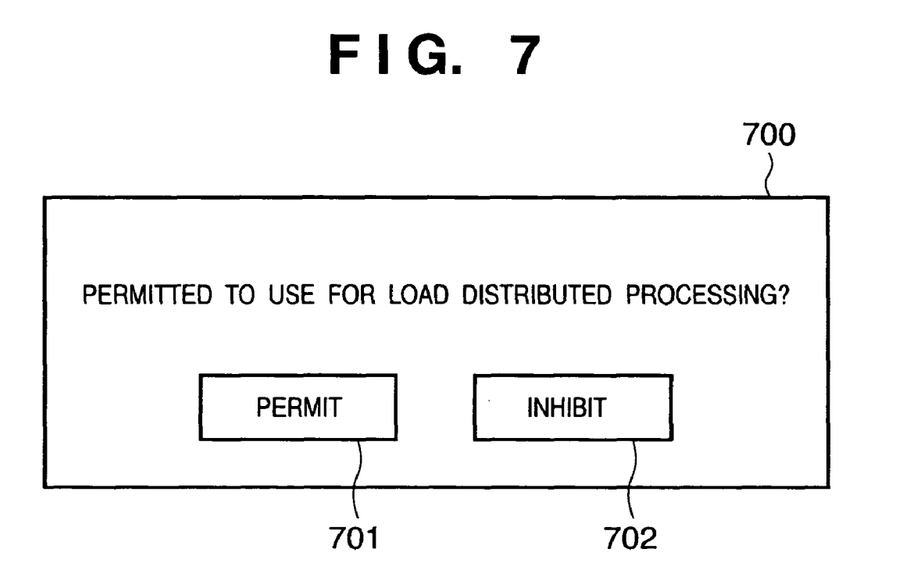
FIG. 7 is a view showing an example of a user interface window according to the first embodiment.

FIG. 7 shows an example of the interface window. In the window 700 shown in FIG. 7, a message representing "Is use for load distributed processing permitted?", a radio button 701 representing "permit", and a radio button 702 representing "inhibit" are displayed.

When the user selects the radio button 702 representing "inhibit" in the window shown in FIG. 7 (by clicking the mouse) (NO in step S601), the processing is finished without registering the client information in the database as information to be subjected to load distributed processing. This operation is executed when the user using the client does not want to permit load distributed processing in some reasons, or when the client is a device frequently used by the plurality of users, like a file server or printer server. This is because inconvenience is caused when permitting load distributed processing.

Alternatively, when the user selects the radio button 701 representing "permit" in the window shown in FIG. 7 (by clicking the mouse) (YES in step S601), the same processing after step S502 shown in FIG. 5 is executed.

That is, in step S502, the client notifies the network printer to be subjected to processing of the printer driver that the client can be used as the resource of grid computing, and then transmits the required information.

In step S503, the network printer receives the required information transmitted from the client in step S502. The information of the client to be subjected to load distributed processing is registered in the grid database.

In step S504, the network printer transmits a program (e.g., screen saver) for causing the client to execute load distributed processing by grid computing. This program is a program which is executed by the CPU of the client with a free space, and has the functions of an RM and broker of the grid. When executing the received program, the client is subjected to load distributed processing.

As described above, according to this embodiment, it is determined whether the client enters the grid network in accordance with the user's instruction. Hence, the system becomes flexible, thereby improving the convenience of the user.

Note that the processing shown in FIG. 6 may be executed not only when the printer driver is installed, but also, e.g., when the user activates the printer driver to execute a predetermined operation.

With this operation, it can be switched whether the client enters to the grid network upon changing the use environment of the client. Hence, the system becomes further flexible, thereby further improving the convenience of the user.

Third Embodiment

The third embodiment of the present invention will be described below. The print system of the third embodiment is similar to the first and second embodiments. A description of the same parts as in the first and second embodiments will be omitted, and characteristic parts of the third embodiment will mainly be described.

In the first and second embodiments, the present invention is applied to a single network print system including one network printer and a plurality of clients. In the third embodiment, the present invention is applied to a plurality of network print systems each having one network printer and a plurality of clients.

Figure 8:
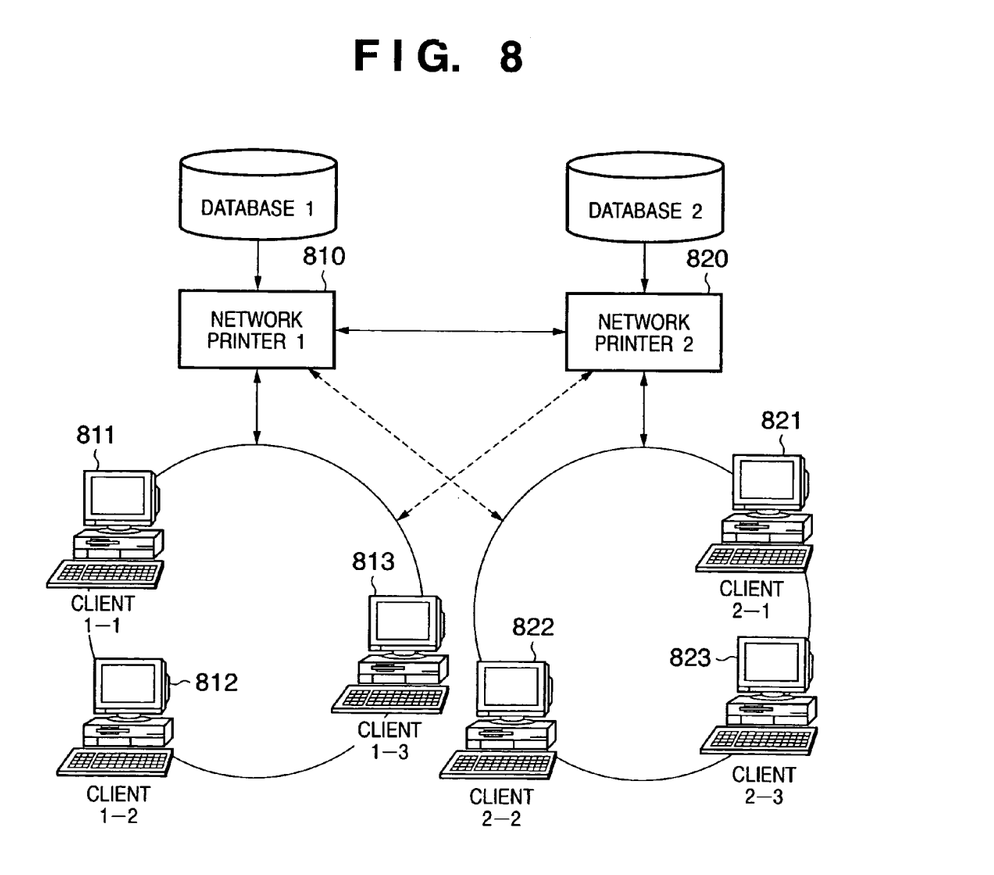
FIG. 8 is a block diagram showing the schematic arrangement according to the third embodiment.
Figure 9A:
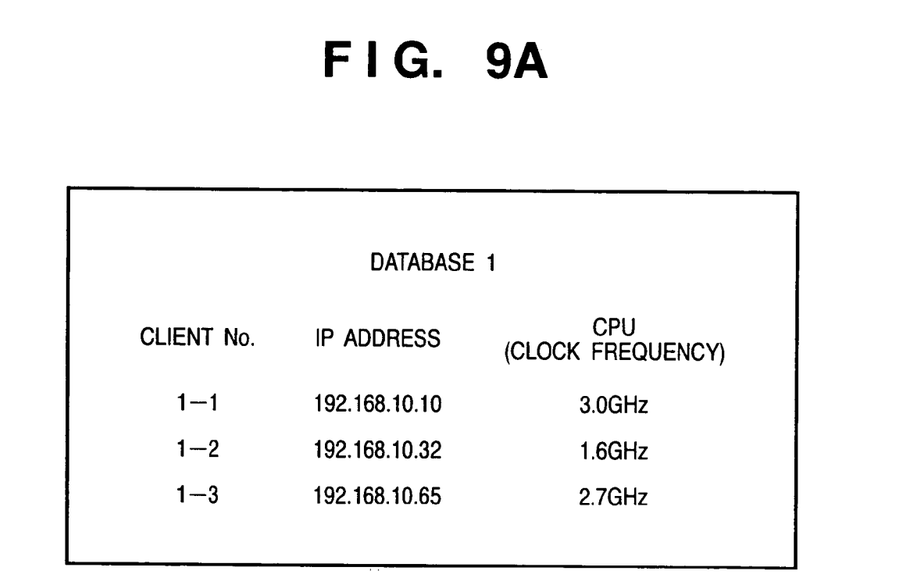
FIGS. 9A and 9B are views showing an example of a database according to the third embodiment.
Figure 9B:
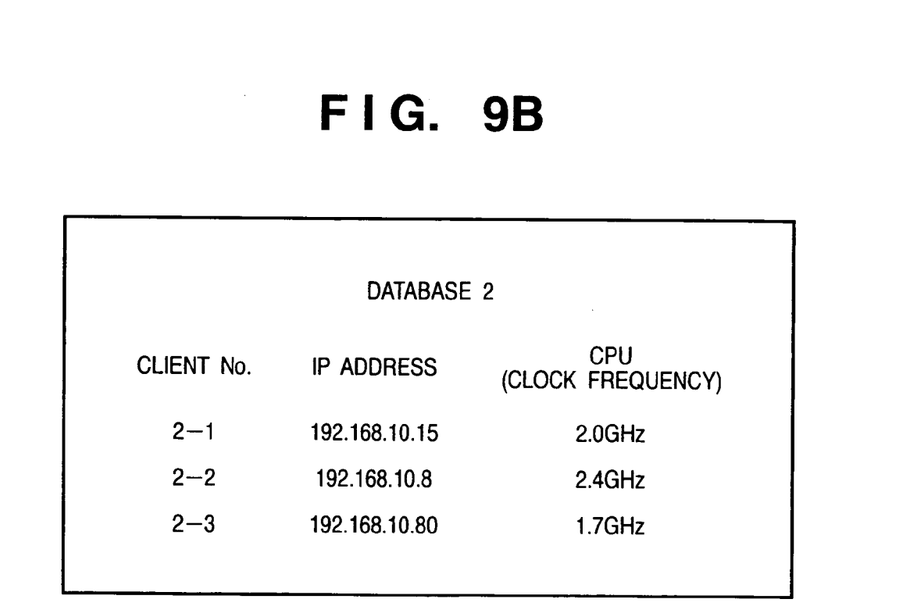

FIG. 8 is a block diagram showing an arrangement according to the third embodiment. FIGS. 9A and 9B are views showing an example of each database according to the third embodiment. Note that in the example shown in FIG. 8 and FIGS. 9A and 9B, the number of clients connected to each of the network printers is three. However, the number of clients is not limited to this.

As shown in FIG. 8, a network printer 1 (810) is connected to three clients 811 to 813, and has a database 1 in which client information shown in FIG. 9A is registered. A network printer 2 (820) is also connected to three clients 821 to 823, and has a database 2 in which the client information shown in FIG. 9B is registered.

Note that the network printer 1 (810) is not only connected to the clients 811 to 813, but also to the network printer 2 (820) and the clients 821 to 823. Similarly, the network printer 2 (820) is not only connected to the clients 821 to 823, but also to the network printer 1 (810) and the clients 811 to 813.

All of the network printer 1 (810), network printer 2 (820), clients 811 to 813, and clients 821 to 823 may be arranged on a network on which these printers and clients can be connected to each other. However, the clients 811 to 813 and the clients 821 to 823 need not be directly connected to each other.

In the third embodiment, the network printer 1 (810) and the network printer 2 (820) can transmit/receive the database information to/from each other. In one printer, a job can be subjected to load distributed processing in the optimum client, on the basis of the database received from the other printer.

As described above, since the database information can be transmitted/received to/from each other, the load can be distributed from the network printer 1 to the clients registered in the database 2, and the load can also be distributed from the network printer 2 to the clients registered in the database 1, through a channel indicated by a dashed line shown in FIG. 8.

Even if the number of network printers and systems are three or more, of course, load distributed processing can be executed by using the resource of the client in one of the systems, when the database information can be transmitted/received as described above.

Even if grid computing is implemented without any database in the network printer, load distributed processing can be executed by using the resource of the client in the system, when the database information is received from the system according to the present invention.

As described above, according to the third embodiment, the plurality of grid computing networks which are individually built are connected to each other to transmit/receive the database information to/from each other. Accordingly, load distributed processing can be executed more flexibly than that executed by using the resource of the client in each of the plurality of systems.

Fourth Embodiment

The fourth embodiment of the present invention will be described below. In a network print system of the fourth embodiment similar to the third embodiment, the present invention is applied to a plurality of network print systems. A description of the same parts as in the third embodiment will be omitted, and characteristic parts of the fourth embodiment will mainly be described.

In the third embodiment, the plurality of network print systems transmit/receive pieces of database information of the respective network printers to/from each other, to execute distributed processing by using the resource of the client in the other system. However, in the fourth embodiment, distributed processing can be executed by using the resources of the clients in two systems, by merging databases of two systems.

According to the fourth embodiment, the arrangement of a grid network shown in FIG. 8 is similar to the third embodiment. The registered contents of databases 1 and 2 are also similar to those shown in FIGS. 9A and 9B.

Figure 10:
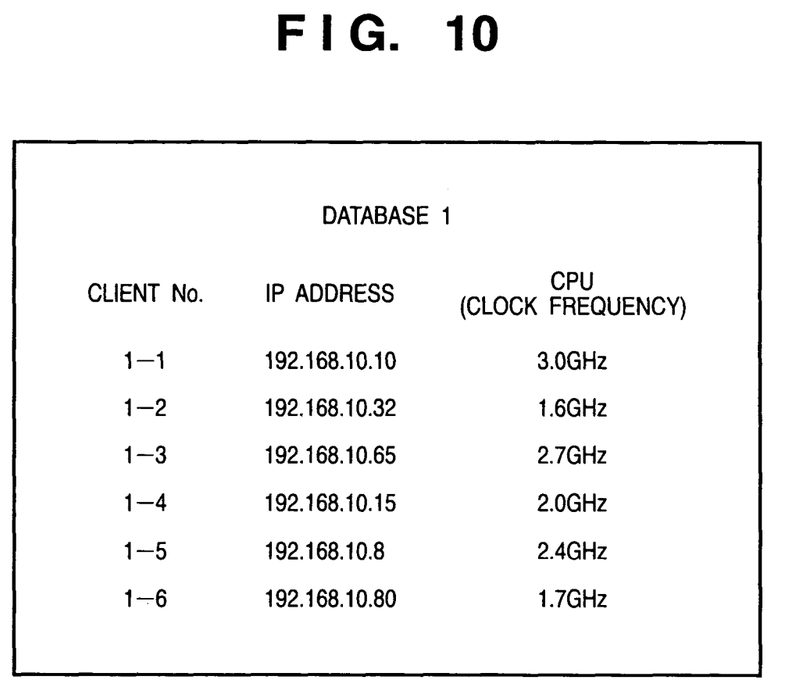
FIG. 10 is a view showing an example of the merged database according to the fourth embodiment.

FIG. 10 shows an example of the merged database according to the fourth embodiment. In the example shown in FIG. 10, the client registered in the database 2 shown in FIG. 9B is additionally registered in the database 1 shown in FIG. 9A in the third embodiment.

Note that when additionally registering the client which has been registered in another database, it is determined whether the client information to be added to another database matches the client information registered in the original database. When the client information to be added matches the client information registered in the original database, additional registering operation can be avoided. This determination can be performed on the basis of the information such as IP address which is unique to the client.

As described above, according to the fourth embodiment, when the plurality of grid computing networks are connected to each other to merge the databases, load distributed processing can be executed more flexibly than that executed by using the resource of the client in each of the plurality of systems.

Other Embodiment

The present invention may be applied to a grid computing system (grid network) including a plurality of devices, and may be applied to one device included in the grid network.

Furthermore, the invention can be implemented by supplying a software program, which implements the functions of the foregoing embodiments (program corresponds to flowcharts shown in FIG. 5 or 6), directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed on the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed on the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-171769, filed Jun. 9, 2004, which is hereby incorporated by reference.

What is claimed is:

1. A print system in which at least one printer and multiple information processing apparatuses are connected to each other via a network,
   wherein each information processing apparatus of the multiple information processing apparatuses comprises:
      an installation unit configured to install a printer driver of the printer;
      a first transmission unit configured to transmit a notification in which each information processing apparatus of the multiple information processing apparatuses having the printer driver for the printer to be used as a client, and information required for processing a part of a print job distributed from the printer, in a case an installation is performed by the installation unit;
      a reception unit configured to receive a program transmitted from the printer in response to a transmission by the first transmission unit;
      an implementing unit configured to implement the program received by the reception unit to process a part of a print job, when the part of the print job is distributed from the printer; and
      a second transmission unit configured to transmit the processed part of the print job to the printer,
   wherein the printer has a database of information about the multiple information processing apparatuses, the printer comprising:
      a registration unit configured to register into the database, as clients, each of the multiple information processing apparatuses that have the printer driver of the printer and the information transmitted by the first transmission unit;
      a program transmission unit configured to transmit the program to the multiple information processing apparatuses registered into the database by the registration unit;
      a job distribution unit configured to segment the print job into plural parts and distribute each of the plural parts to each of the clients in a case that the print job Is received from one of the information processing apparatuses of the multiple information processing apparatuses; and
      a collection unit configured to receive each processed part of the print job that is processed by each client and collect each processed part of the print job to execute the print job.

2. The system according to claim 1, wherein the information required for processing a part of a print job includes at least one of an IP address and an operation speed of a CPU of the information processing apparatus of the multiple information processing apparatuses.

3. The system according to claim 1, wherein each information processing apparatus of the multiple information processing apparatuses further comprises a user interface window which causes a user to select whether or not each information processing apparatus of the multiple information processing apparatuses is able to be the client.

4. The system according to claim 1,
   wherein a first printer, a second printer and the multiple information apparatuses are connected to each other via a network, and
   wherein the registration unit of the first printer registers, as a client, an additional information processing apparatus of the multiple information apparatuses which is registered by the registration unit of the second printer.

5. The system according to claim 1, wherein the print job includes PDL-related processing.

6. The system according to claim 1, wherein the printer is a multifunction device, and at least one information processing apparatus of the multiple information processing apparatuses is a personal computer.

7. A print method executed in a print system including a printer connected to multiple information processing apparatuses via a network, comprising the steps of:
   installing, in an information processing apparatus of the multiple information processing apparatuses, a printer driver of the printer;
   transmitting by the information processing apparatus, a notification in which the information processing apparatus has the printer driver of the printer to be used as a client and information required for processing part of a print job distributed from the printer, when an installation is performed by the installation step in a case an installation is performed in the installing step;
   registering, in the printer, into a database of information about the multiple information processing apparatuses, as clients, each of the multiple information processing apparatuses that have the printer driver of the printer and the information transmitted in the first transmission step;
   transmitting, by the printer, a program to each of the information processing apparatuses of the multiple information processing apparatuses registered into the database in the registering step;
   segmenting in the printer, a print job into plural parts and distributing each of the plural parts to each of the client in a case that the print job is received from one of the information processing apparatuses of the multiple information processing apparatuses; and
   receiving, in the information processing apparatus, the program transmitted from the printer in response to a transmission in the transmitting step;
   implementing, in the information processing apparatus, the program received in the receiving step to process a part of a print job, when the part of the print job is distributed from the printer;
   transmitting, by the information processing apparatus, a processed part of the print job to the printer; and
   receiving by the printer, each processed part of the print job that is processed by each client and collecting each processed part of the print job to execute the print job.

* * * * *